Patented Feb. 20, 1923.

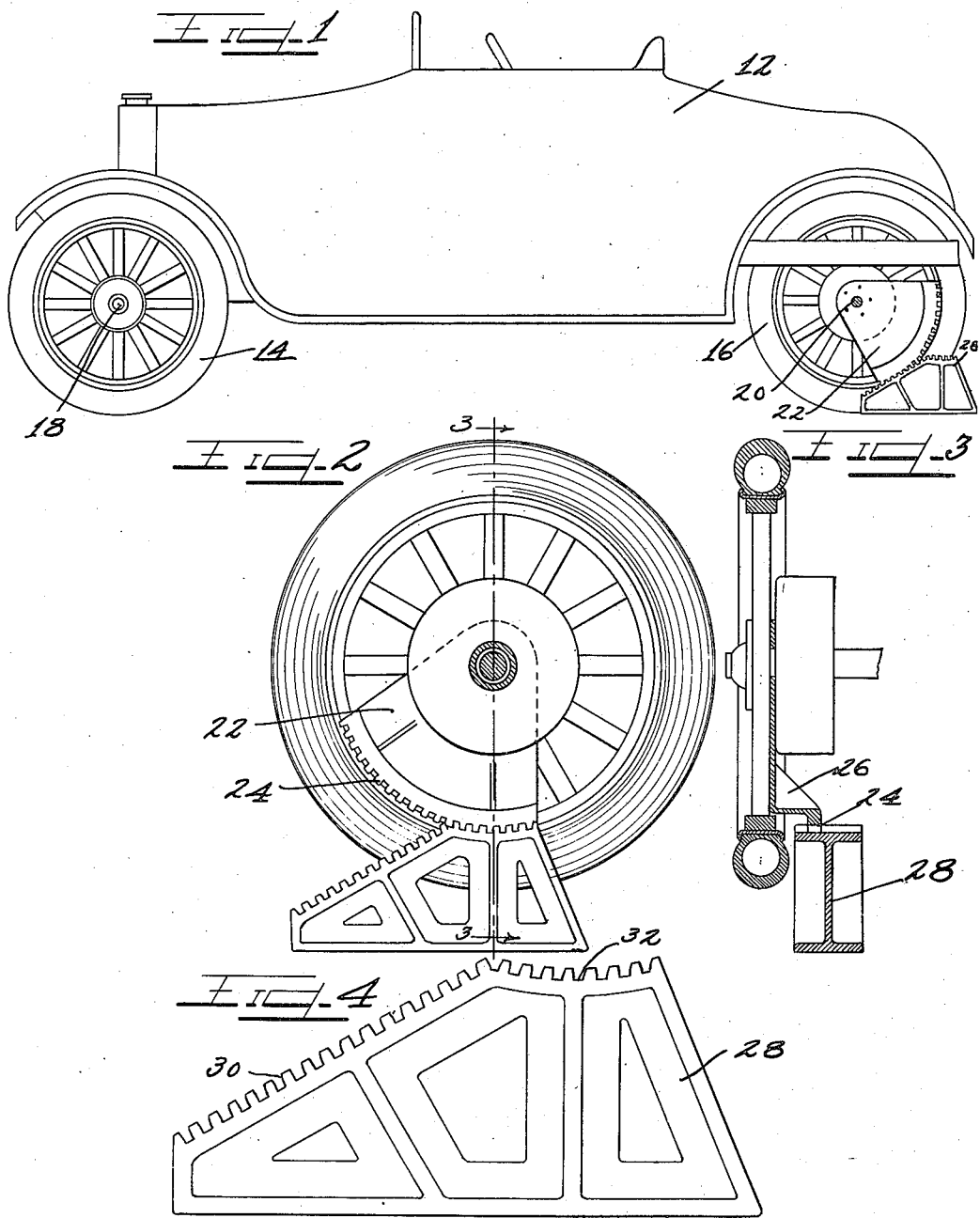

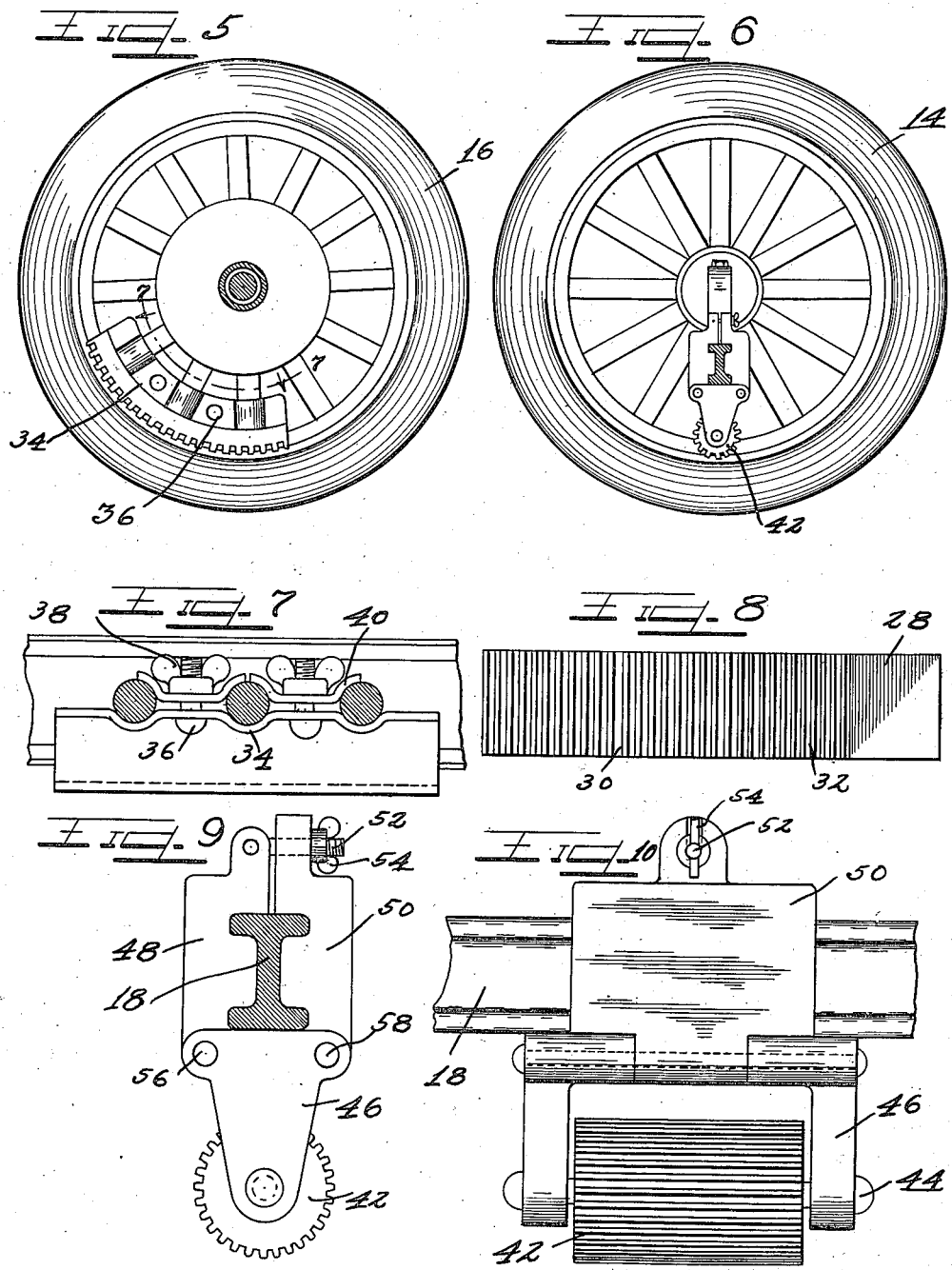

1,445,928

UNITED STATES PATENT OFFICE.

CHARLES R. BAKER, OF EVANSTON, ILLINOIS.

AUTOMOBILE JACKING DEVICE.

Application filed December 9, 1920. Serial No. 429,308.

*To all whom it may concern:*

Be it known that I, CHARLES R. BAKER, a citizen of the United States, and a resident of the city of Evanston, in the county of Cook and State of Illinois, have invented certain new and useful Improvements in an Automobile Jacking Device; and I do hereby declare that the following is a full, clear, and exact description of the same, reference being had to the accompanying drawings, and to the numerals of reference marked thereon, which form a part of this specification.

This invention has for its object the construction of a simple device for elevating the axle of an automobile for changing a wheel, tire, or for other purposes, such as repairs or the like, and is designed to take the place of the ordinary hand operated jack now in universal use. It is well known that the usual lifting jack for automobiles has many disadvantages particularly as in the use of same the operator is required to position the jack beneath the axle of the car and this, especially in the case of the rear axle, which is not very accessible, can generally only be accomplished by the operator getting down upon his knees in the road to properly position the jack and as most cars nowadays have the gasoline tank situated at the rear, this necessitates a further stretching of the arm of the operator underneath the car to properly position the jack with relation to the axle. The gasoline tank is usually covered with dirt and grease which is apt to come off upon the clothes of the operator and soil them causing much annoyance and expense. The lifting handle for the ordinary jack now employed is also very likely to become lost or misplaced and its operation in the cramped quarters underneath the car requires considerable work and also usually involves additional soiling of the clothes of the operator thereof.

One of the objects therefore of this invention is the provision of an improved lifting or jacking device for automobiles which will eliminate the annoyance and trouble occasioned by the use of the ordinary jacks.

Another object of the invention is the provision of a lifting device for automobiles wherein the power of the automobile itself is employed to raise the same from the ground.

Still another object of this invention is the provision of a lifting device or jack which can be readily positioned beneath the axle of the car and which, if desired, may be positioned in the road either in front of or behind the car, and the car then driven up to same, whereupon it is lifted after coming into proper relation therewith, thus entirely eliminating the necessity of stooping down and reaching under the car to position the jack.

A still further important object of this invention is the provision of an automobile jacking device which is compact and may be made in two or more readily assembled portions, and which can be readily carried in the tool box or, if desired, in a small compartment provided therefor on or underneath the running board of the car.

Other and further important objects of this invention will be apparent from the disclosures in the accompanying drawings and specifications.

The invention (in a preferred form) is illustrated in the drawings and hereinafter more fully described.

On the drawings:

Figure 1 is a side elevation of an automobile equipped with the improved jacking device showing the same in operation.

Figure 2 is a detail view showing the rear wheel of an automobile with the device applied thereto and elevated thereby from the ground.

Figure 3 is a section taken on the line 3—3 of Figure 2.

Figure 4 is a side elevation of one member of the improved jacking device.

Figure 5 is a side elevation of the rear wheel of an automobile equipped with a slightly modified form of the invention.

Figure 6 is a side elevation showing the front wheel of an automobile and a section of the front axle with the corresponding device of the invention applied thereto.

Figure 7 is a section taken on the line 7—7 of Figure 5 looking in the direction indicated by the arrows.

Figure 8 is a top plan view of the device shown in Figure 4.

Figure 9 is an enlarged detail view showing the front axle member as disclosed in Figure 6.

Figure 10 is a rear view of the device shown in Figure 9.

As shown on the drawings:

The reference numeral 12 indicates an automobile having front wheels 14 and rear wheels 16 supported by axles 18 and 20 respectively. In the preferred form of the invention the rear wheel has fixed thereto between the brake drum and the spokes of the wheel a segment member 22 having teeth 24 along the circular outer edge of same, the center of this circular arc being the point about which the wheel turns. This segmental member 22 is arranged to revolve with the wheel and is fixed thereto being merely in the form of a plate forming a segment of a circle. The outer edge of this segment is provided with teeth 24 which are offset from the face thereof by the inwardly extending reinforcing members 26 best shown in Figure 3.

Adapted to co-operate with this segmental member 22 is the stand 28 in the form of an inclined gear rack 30, as shown in Figure 4, and having at the top portion thereof a depression 32 likewise provided with teeth and which is in the form of an arc of a circle corresponding in size to the circular segment 22. This depression 32 is adapted to conform with the rear portion of the segment 22 and permit the same to rest therein and hold the car in position after it has been run up the inclined plane or lifting member 28. If preferred, the member 22 may be replaced by a corresponding series of plates or plate 34, as shown in Figure 5, the outer plate 34 being provided with teeth to mesh with the teeth 30 and this plate is held in place by means of bolts and winged nuts 36 and 38 respectively which co-act with holding plates 40 having holes therein corresponding to similar holes in the plate 34 positioned between the spokes of the wheel and through which the bolts 36 are adapted to be passed after which the nuts 38 are affixed and tightened thereby securely holding the device in position upon the wheel of the car.

As will be evident, the segmental portions 22 or 34 which are to be attached to the rear wheel of the car must be fixed so as to turn with the wheel, otherwise, on account of the differential gear action, the driving power action of the remaining rear wheel would be lost after one wheel has left the ground were the segment not fixed to the wheel while riding up on the inclined plane of the member 28. However, a similar attachment for the front axle would not need to be affixed to the wheels but can be attached to the axle by means of the device shown in Figures 6, 9 and 10. In this embodiment of the invention a cog wheel 42 is provided having gear teeth to correspond with the teeth 30 on the inclined plane member 28 and this cog wheel or cylinder is revolvably supported upon an axle 44 held in bearings 46 which extend downwardly from the front axle of the car 18 and are held in position thereon by means of two pivoted clamping members 48 and 50 made to correspond with the I-beam of the axle and, as best shown in Figure 9, are held in adjusted position upon the axle by means of a pivoted bolt 52 and a winged nut 54 thereon. From the showing in Figure 10 it will be evident that the wheel or cog member 42 is in the shape of a geared cylinder as this particular form has been found to be stronger and otherwise more adaptable for the purpose of the invention. The clamping members 48 and 50 are pivoted or hinged to the bearing members 46 at 56 and 58 respectively so as to allow of the ready application of the device to the front axle of a car.

The operation of the device is as follows:

The inclined plane member 28 is of such size and shape that when placed in proper position upon the ground immediately in front of or behind the axle of the car when the tire is flat or when the car is to be raised for any other reason, the cogs of the wheel 42 or of the segment portion 22 and 34 will engage the cogs or teeth 30 near the end or lowest part of the inclined plane 28. The car may then be slowly driven forward or backward according to the location of the device, which will cause the gear wheel or segment to engage with the teeth 30 and ride up to the top of the inclined plane and then descend slightly into the central concave portion 32. The motion of the car will now be stopped and as a result the axle thereof will be sufficiently elevated so that changes of wheels, tires, or other repairs can be made. The wheel, as will be seen, cannot be easily displaced from its elevated position on account of the depression 32 and in view of the fact that the inclined plane member 28 can be made broad or may be provided with lateral supports the liability of its toppling over is very remote.

The device may be made of steel, iron, or any other suitable material. The lateral supports mentioned are not necessary but may be preferred and can be hinged in position so as to be readily swung outwardly so as to help stabilize the inclined plane member and also the car when the jacking device is in use. The inclined plane member 28 may be made of one piece of material or of several parts rigidly fastened together, or it may be collapsible to some extent by being provided with hinges, so that it may be more conveniently carried in an automobile tool case, or if preferable it may be made of two or more parts which may be easily taken apart and readily connected in such a manner that the device will properly serve its purpose. It is further evident that the inclined plane device and the corresponding wheels may be made in a number of different sizes and weights, to fit different makes and types of automobiles, and their construction is such that they may be readily attached to any machine. The gear wheels, segments, and their attachments may also be made in a number of different sizes and weights in order to harmonize with different inclined plane members 28.

I am aware that various details of construction may be varied through a wide range without departing from the principles of this invention, and I therefore do not purpose limiting the patent granted otherwise than necessitated by the prior art.

I claim as my invention:

1. A jacking device for automobiles including an inclined member, a series of gear teeth on the inclined portion thereof, a depression in the top thereof, a corresponding segment adapted to be fixed to a wheel and co-operate with the inclined member, and teeth on the segment corresponding to the teeth upon the inclined member.

2. The combination with a wheel, of a gear segment, a plate integrally formed thereon, retaining plates, means for locking said plate and said retaining plates to said wheel, and rack means for coaction with said gear segment.

3. The combination with a wheel, and the spokes thereof, of a gear segment, an apertured plate having grooves therein to permit the plate to seat against the wheel spokes, an apertured and grooved retaining plate, bolts engaging through said plates to rigidly hold the gear segments secured to said wheel, a toothed means with which said gear segment is adapted to coact.

In testimony whereof I have hereunto subscribed my name in the presence of two subscribing witnesses.

CHARLES R. BAKER.

Witnesses:
 CHARLES W. HILLS, Jr.,
 SPENCER W. GIBBS.